(12) United States Patent
Keskin

(10) Patent No.: US 8,259,081 B2
(45) Date of Patent: Sep. 4, 2012

(54) LOW-POWER TOUCH SCREEN CONTROLLER

(75) Inventor: Mustafa Keskin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1051 days.

(21) Appl. No.: 12/098,093

(22) Filed: Apr. 4, 2008

(65) Prior Publication Data

US 2009/0251436 A1 Oct. 8, 2009

(51) Int. Cl.
*G06F 3/041* (2006.01)
(52) U.S. Cl. .......................... 345/173; 345/174; 345/204
(58) Field of Classification Search .......... 345/173–179; 178/18.01
See application file for complete search history.

(56) References Cited

U.S. PATENT DOCUMENTS 5,717,321 A * 2/1998 Kerth et al. .................... 323/283

OTHER PUBLICATIONS

Bonnie C. Baker, Wendy Fang: "Powering resistive touch screens efficiently" May 2007, XP002576061 Retrieved from the Internet: URL:http://www.eetindia.co.in/STATIC/PDF/200705/EEI0L_2007MAY28_P0W_0PT0_INTD_EMS TA_01.pdf?S0URCES=D0WNL0AD> [retrieved on Mar. 24, 2010] p. 3, col. 1, line 1-line 6 p. 3, col. 3, line 6—col. 4, line.
International Search Report & Written Opinion—PCT/US2009/039519, International Search Authority—European Patent Office—Apr. 12, 2010.
"PDA Analog Interface Circuit" Texas Instruments, TSC2000, http://focus.ti.com/lit/ds/sbas257/sbas257.pdf—497.3k PDF file, SBAS257—Feb. 2002.
"15kV ESD-Protected Touch-Screen Controllers Include DAC and Keypad Controller" Maxim; Document No. 19-2512; Rev 1:Sep. 2003 URL: www.maxim-ic.com/quick_view2.cfm/qv_pk/3550/t/or/pt/MAX1233/pk/THIN%20QFN—28k.

* cited by examiner

*Primary Examiner* — Kevin M Nguyen
*Assistant Examiner* — Kenneth B Lee, Jr.
(74) *Attorney, Agent, or Firm* — Larry Moskowitz; Eric Ho

(57) ABSTRACT

While taking X-Y coordinate measurements to determine the location of a point of contact on a touch screen, a controller circuit drives the touch screen with a selectable voltage. Voltages output from the touch screen are converted by an ADC into the X-coordinate and Y-coordinate values. The ADC has a convertible input voltage range. If only a low touch screen detection resolution is required, then the voltage with which the touch screen is driven is made to be substantially less than the convertible input voltage range. Only a portion of the convertible input range is usable, but this is adequate for the application and power consumption is reduced. If a higher touch screen detection resolution is required, then the touch screen is driven with a higher voltage. Power consumption is increased, but more or all of the convertible input voltage range of the ADC is then usable.

24 Claims, 6 Drawing Sheets

NO TOUCH

TOUCH

| RES OF ADC | TOTAL NUMBER OF ADC STEPS | CONVERTIBLE INPUT VOLTAGE RANGE OF ADC | TOUCH PANEL CURRENT | USABLE INPUT VOLTAGE RANGE OF ADC | USABLE ADC STEPS |
|---|---|---|---|---|---|
| 12-BITS | 4095 | 0.0 - 2.6V | 13 mA | 0.0V - 2.6 V | 0-4095 |
| 10-BITS | 1023 | 0.0 - 2.6V | 13 mA | 0.0V - 2.6 V | 0-1023 |
| 8-BITS | 255 | 0.0 - 2.6V | 13 mA | 0.0V - 2.6 V | 0-255 |
| 12-BITS | 4095 | 0.0 - 2.6V | 6.5 mA | 0.0V - 1.3 V | 0-2047 |
| 10-BITS | 1023 | 0.0 - 2.6V | 13.25 mA | 0.0V - 0.65 V | 0-1023 |
| 8-BITS | 255 | 0.0 - 2.6V | 10.813 mA | 0.0V - 0.1625 V | 0-255 |

PROGRAMMABLE VOLTAGE EMBODIMENT

PROGRAMMABLE CURRENT EMBODIMENT

LOW-POWER TOUCH SCREEN CONTROLLER

BACKGROUND INFORMATION

1. Field

The disclosed embodiments relate to touch screens.

2. Background

Many electronic devices such as, for example, cellular telephones have touch screens (sometimes referred to as "touch panels"). By using a touch screen, the display area of the electronic device serves both as a display and also as a user input interface to enable a user to interact with and control the electronic device.

FIG. 1 (Prior Art) is a conceptual diagram of one type of touch screen 1. Touch screen 1 involves a first sheet 2 of transparent resistive material and a second sheet 3 of transparent resistive material. These two sheets are disposed over the display of the electronic device so that the display can be seen by the user through the touch screen. A first conductive bus bar 4 is attached to the upper left edge of sheet 2 and a second conductive bus bar 5 is attached to the lower right of sheet 2. Similarly, a third conductive bus bar 6 is attached to the upper right edge of sheet 3 and a fourth conductive bus bar 7 is attached to the lower left edge of sheet 3. When the touch screen is not being touched, the two sheets 2 and 3 do not touch one another. When the touch screen is pressed at a point of contact, the pressure of the touching causes the two sheets 2 and 3 to make electrical contact with one another at the point of contact. Electronics coupled to the touch screen determines an X-coordinate and a Y-coordinate on the touch screen that indicates the point of contact.

FIGS. 2 and 3 (Prior Art) are conceptual schematic diagrams that illustrate how the touch screen and its associated electronics determine the X-coordinate and the Y-coordinate of the point of contact. FIG. 2 is a cross-sectional side view of the touch screen. The upper row of resistors represents the upper sheet 2. The lower row of resistors represents the lower sheet 3. FIG. 2 illustrates the touch screen when the user is not touching the screen and the two sheets 2 and 3 are not touching each other. At a first time, a voltage is impressed between XP_UL and XM_LR. The YM_LL end of sheet 3 is made to be an open, and a high input impedance voltage sensor 8 is used to detect a voltage on sheet 3. In the case of FIG. 2, the lower sheet 3 does not receive a voltage from upper sheet 2 and this condition is sensed by sensor 8. At a second time, a voltage is impressed between YP_UR and YM_LL. The XM_LR end of sheet 3 is made to be an open, and a high input impedance voltage sensor 9 is used to detect a voltage on upper sheet 2. In the case of FIG. 2, upper sheet 2 does not receive a voltage from lower sheet 3 and this condition is sensed by sensor 9. From the voltages detected by sensors 8 and 9 at the first time and second time, the electronics of the touch screen determines that the two sheets 2 and 3 are not touching each other.

FIG. 3 (Prior Art) illustrates the touch screen when the user is touching the screen. The two sheets 2 and 3 are therefore touching each other at a point of contact as illustrated. At a first time, a voltage is impressed between XP_UL and XM_LR. The YM_LL end of sheet 3 is made to be an open, and sensor 8 is used to detect a voltage on lower sheet 3. The upper sheet 2 forms a resistive voltage divider with the point of contact being a tap on the voltage divider. There is no current flow through lower sheet 3 due to YM_LL being open and due to sensor 8 being a high input sensor. The voltage sensed by sensor 8 is therefore the voltage on the tap of the voltage divider. The magnitude of the sensed voltage therefore indicates the location of the touching between XP_UL and XM_LR. The voltage may be converted into a digital value and this digital value may be considered to be the X-coordinate of the point of contact. Then, at a second time, a voltage is impressed between YP_UR and YM_LL of the lower sheet 3. The XM_LR end of upper sheet 2 is made to be an open, and high input impedance voltage sensor 9 is used to detect a voltage on sheet 2. The lower sheet 3 forms a voltage divider with the point of contact being a tap on the voltage divider. There is no current flow through upper sheet 2, so the voltage sensed by sensor 9 is the voltage on the tap of the voltage divider, and therefore indicates the location of the touching between YP_UR and YM_LL. This voltage may be converted into a digital value and this digital value may be considered to be Y-coordinate of the point of contact.

FIG. 4 (Prior Art) is a simplified diagram of one type of conventional touch screen controller integrated circuit 10. At a first time, control portion 11 causes switches 12 and 13 to close such that a regulated analog supply voltage AVDD is supplied onto terminal 14 and such that terminal 15 is grounded. The voltage AVDD is therefore supplied across sheet 2. Analog multiplexer 16 is controlled such that the voltage on terminal 17 is supplied onto an input of an analog-to-digital converter (ADC) 18. ADC 18 converts the voltage on terminal 17 into a multi-bit digital value usable as the X-coordinate. At a second time, control portion 11 causes switches 19 and 20 to close such that voltage AVDD is supplied onto terminal 17 and such that terminal 21 is grounded. The voltage AVDD is therefore supplied across sheet 3. Analog multiplexer 16 is controlled such that the voltage on terminal 14 is supplied onto the input of ADC 18. ADC 18 converts the voltage on terminal 17 into a multi-bit digital value usable as the Y-coordinate. Battery voltage VBATT between terminals 22 and 23 is regulated to generate the analog supply voltage AVDD. Rather than there being two sensors 8 and 9 as illustrated in the conceptual diagrams of FIGS. 2 and 3, the functions of sensors 8 and 9 are performed by multiplexer 16 and ADC 18 in FIG. 4.

The touch screen is usable in different situations where different amounts of precision of detecting the point of contact are required. If, for example, large selectable icons may be displayed on the screen. If this is the case, then the detection of the point of contact need not be very precise in order for the electronics of the cellular telephone to determine that a particular large icon is being pressed. In such a situation, ADC 18 can be controlled via bus 24 and register 25 to operate as a lower resolution ADC that outputs multi-bit digital values of a smaller number of bits. If, however, the screen is to be used to detect the selection of very small icons or to detect a user writing on the screen (a user may, for example, use a fine tip stylus to write on the screen), then the detection of the point of contact should be more precise. In this situation, ADC 18 may be controlled to operate as a higher resolution ADC that outputs multi-bit digital values of a larger number of bits. Touch screen control circuitry such as that illustrated in FIG. 4 is sometimes embodied in digital baseband integrated circuits within cellular telephones.

SUMMARY

During the taking of X-coordinate and Y-coordinate measurements to determine the location of a point of contact on a touch screen, a novel touch screen controller circuit drives the touch screen with a selectable one of a plurality of voltages. In one example, voltages output from the touch screen are converted by an analog-to-digital converter (ADC) into multi-bit digital values that are the X-coordinate and Y-coordinate measurement values. The ADC has a convertible input voltage range over which it can generate an output measurement corresponding to a voltage on the ADC input.

If only a low touch screen detection resolution is required, then the voltage with which the touch screen is driven is made to be substantially less than the convertible input voltage range of the ADC. The voltage measured can only range over a part of the convertible input voltage range of the ADC, but using only part of the ADC convertible input voltage range is acceptable due to the low touch screen detection resolution required. Driving the touch screen with the reduced voltage advantageously reduces power consumption in such low touch screen detection resolution situations.

If a higher touch screen detection resolution is required, then the novel touch screen controller circuit drives the touch screen with one of the selectable voltages that is a higher voltage. An example of a situation in which higher touch screen detection resolution might be required is a situation in which the user is writing on the screen using a fine-tipped stylus and in which electronics of a mobile communication device of which the touch screen is a part is attempting to decipher the user's handwriting. In such a situation where one of the high selectable voltages is used to drive the touch screen, more or all of the convertible input voltage range of the ADC is usable to detect and convert a voltage output from the touch screen into a measurement value. More power is consumed, but increased touch screen detection resolution is realized.

Whereas in some embodiments the novel touch screen controller circuit drives the touch screen with a selected one of a plurality of selectable fixed voltages, in other embodiments the novel touch screen controller circuit drives the touch screen with a selected one of a plurality of selectable fixed currents. In some embodiments, the resolution of the ADC is programmable across a bus, as is the voltage/current with which the touch screen is driven during a point of contact measurement. The novel touch screen controller circuit is controlled to drive the touch screen with the lowest voltage/current that still results in adequate touch screen detection resolution for the particular measurement being taken.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

Figure 1:
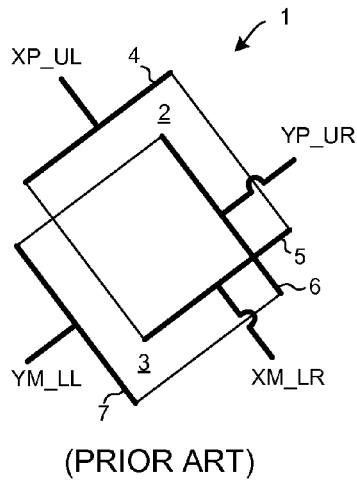
FIG. 1 (Prior Art) is a conceptual diagram of a conventional resistive touch screen.
Figure 2:
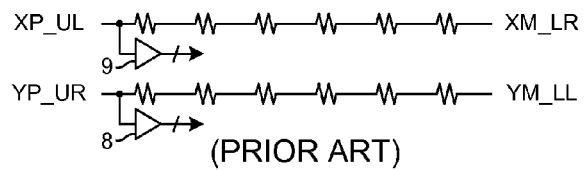
FIG. 2 (Prior Art) is a conceptual diagram of a cross-section of a conventional resistive touch screen in a "no-touch condition".
Figure 3:
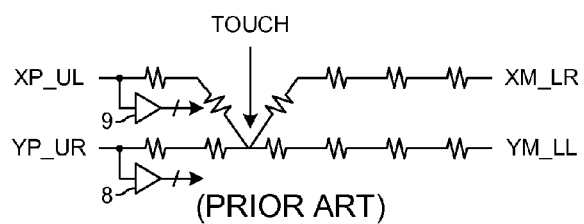
FIG. 3 (Prior Art) is a conceptual diagram of a cross-section of a conventional resistive touch screen in a "touch condition".
Figure 4:
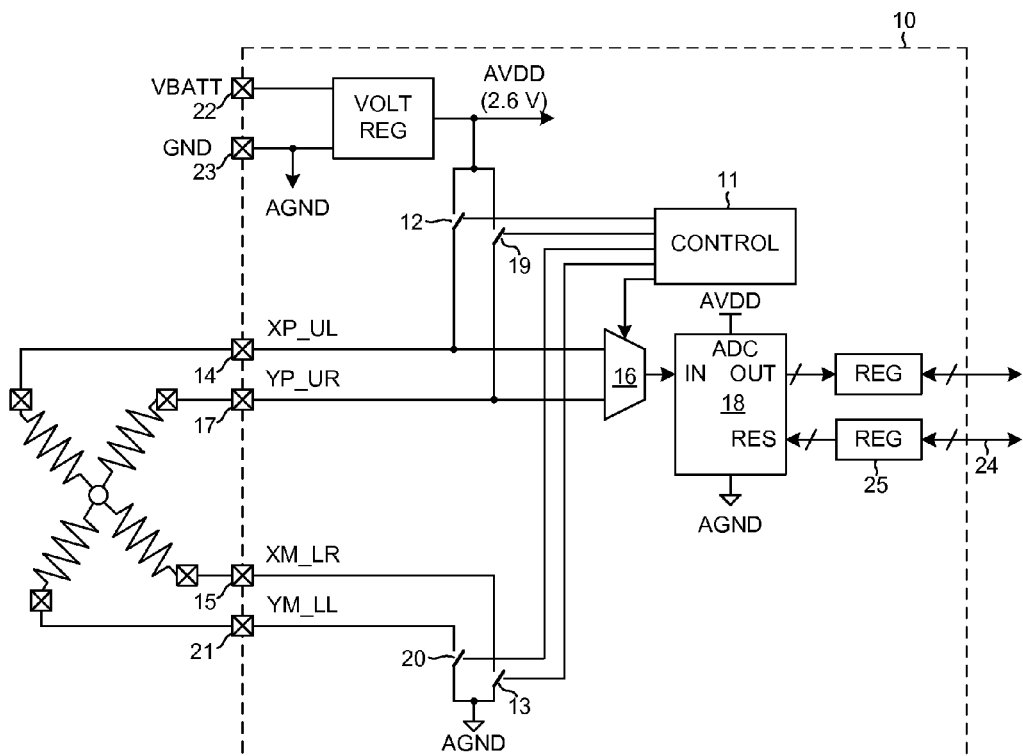
FIG. 4 (Prior Art) is a diagram of a conventional touch screen controller circuit.
Figure 5:
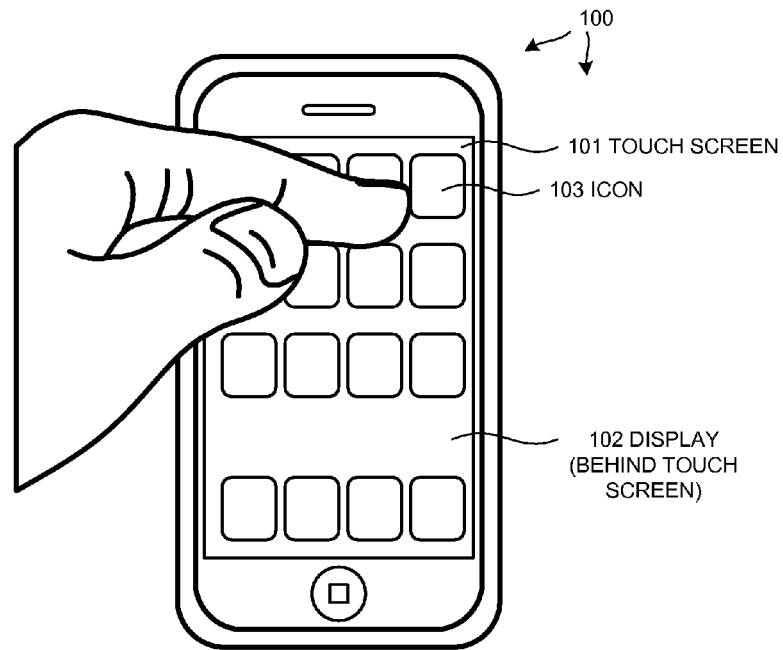
FIG. 5 is a diagram of a mobile communication device in accordance with one novel aspect.

FIG. 5 is a view of an electronic device 100 that includes a resistive touch screen 101. Touch screen 101 is disposed over a display 102 of the device such that the display is viewable through the touch screen. In the example of FIG. 5, the electronic device is a cellular telephone. A user of electronic device 100 can use a finger to select one of a plurality of selectable icons that appear on the screen. Icon 103 is one such icon. When the user's finger presses on the portion of the touch screen disposed over icon 103, a touch screen controller circuit 113 within electronic device 100 detects the pressing and outputs information indicative of the X-coordinate and the Y-coordinate of the point of contact on the touch screen.

Figure 6:
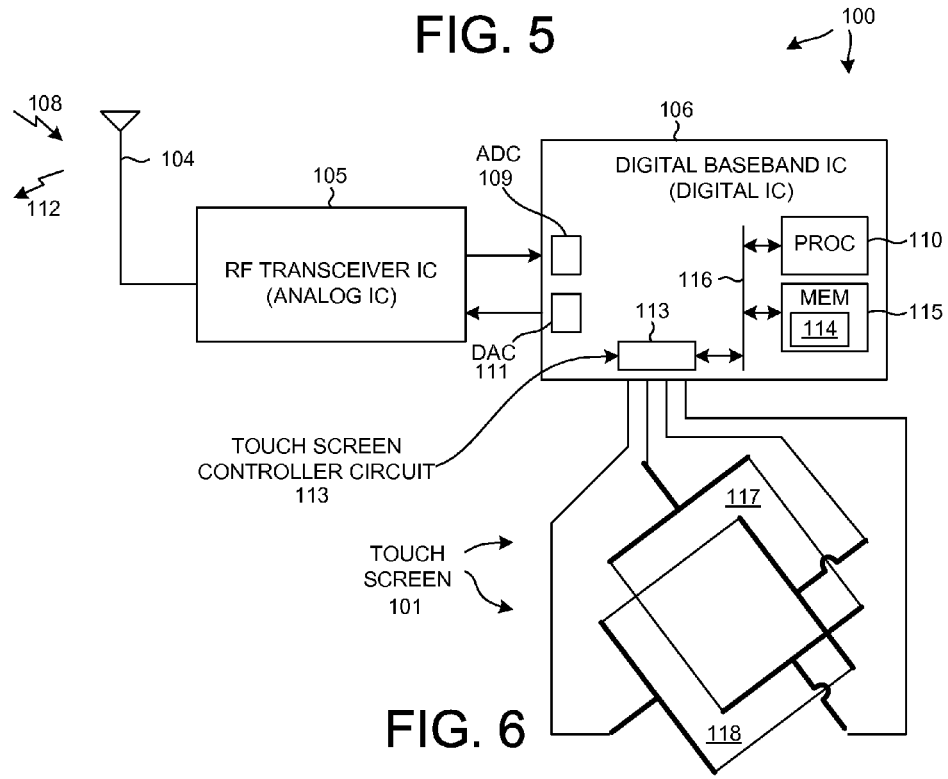
FIG. 6 is a simplified block diagram of the mobile communication device of FIG. 5.

FIG. 6 is a simplified diagram of cellular telephone 100 of FIG. 5. Cellular telephone 100 includes (among several other parts not illustrated) an antenna 104, two integrated circuits 105 and 106, and touch screen 101. A display such as an LCD display (not shown) is disposed behind touch screen 101. Integrated circuit 106 is called a "digital baseband integrated circuit" or a "baseband processor integrated circuit". Integrated circuit 105 is an RF transceiver integrated circuit. RF transceiver integrated circuit 105 is called a "transceiver" because it includes a transmitter as well as a receiver. When the cellular telephone is receiving, a high frequency RF signal 108 is received on antenna 104. Information from signal 108 passes through a receive chain in transceiver integrated circuit 105 and is digitized by an analog-to-digital converter (ADC) 109 in the digital baseband integrated circuit 106. The resulting digital information is processed by a digital processor 110 in the digital baseband integrated circuit 106. If the cellular telephone is transmitting, then information to be transmitted is converted into analog form by a digital-to-analog converter 111 in the digital baseband integrated circuit 106. The analog information passes through a transmit chain in transceiver integrated circuit 105, is amplified by a power amplifier, and is supplied onto antenna 104 so that it is transmitted from antenna 104 as a high frequency RF signal 112. Processor 110 fetches and executes a set of processor-executable instructions 114 stored in or on a processor-readable medium 115 across bus 116. In this case, the processor-readable medium is a semiconductor memory.

Figure 7:
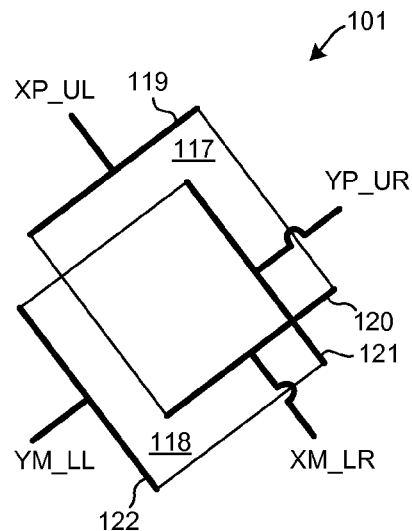
FIG. 7 is a conceptual diagram of the resistive touch screen of FIG. 6.

FIG. 7 is a more detailed diagram of touch screen 101. Touch screen 101 is a conventional resistive touch screen as set forth in the background section of this patent document. Touch screen 101 involves a first sheet 117 of transparent resistive material and a second sheet 118 of transparent resistive material. These two sheets are disposed over display 102 of the electronic device so that display 102 can be seen by the user through the touch screen. A first conductive bus bar 119 is attached to the upper left edge of sheet 117 and a second conductive bus bar 120 is attached to the lower right of sheet 117. Similarly, a third conductive bus bar 121 is attached to the upper right edge of sheet 118 and a fourth conductive bus bar 122 is attached to the lower left edge of sheet 118. When the touch screen is not being touched, the two sheets 117 and 118 do not touch one another. When the touch screen is pressed at a point of contact, the pressure of the touching causes the two sheets 117 and 118 to make electrical contact with one another at the point of contact. Electronics coupled to the bus bars of the touch screen determines an X-coordinate and a Y-coordinate on the touch screen that indicates the point of contact.

Figure 8:
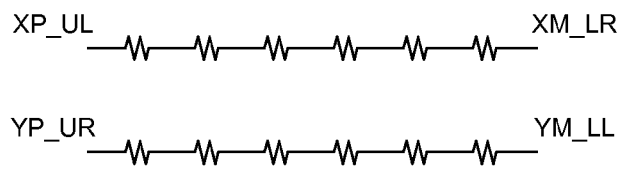
FIG. 8 is a conceptual diagram of a cross-section of the touch screen of FIG. 6 in a "no-touch condition".
Figure 9:
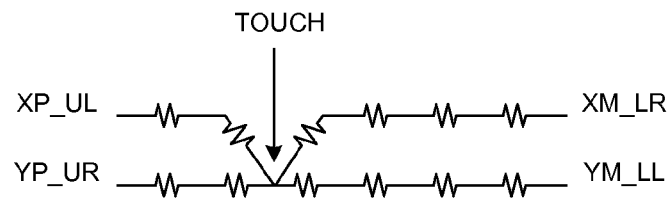
FIG. 9 is a conceptual diagram of a cross-section of the touch screen of FIG. 6 in a "touch condition".

FIGS. 8 and 9 are conceptual schematic diagrams that illustrate how the touch screen and its associated electronics determine the X-coordinate and the Y-coordinate of the point of contact. FIG. 8 is a cross-sectional side view of touch screen 101. The upper row of resistors represents the upper sheet 117. The lower row of resistors represents the lower sheet 118. FIG. 8 illustrates the touch screen when the user is not touching the screen and the two sheets 117 and 118 are not touching each other. At a first time, a voltage is impressed between YP_UL and XM_LR. The YP_LL end of sheet 118 is made to be an open, and the voltage at YP_UR is detected. In the case of FIG. 8, the lower sheet 118 does not receive a voltage from upper sheet 117 and the voltage detected is indicative of this non-touching condition. At a second time, a voltage is impressed between YP_UR and YM_LL. The XM_LR end of upper sheet 117 is made to be an open, and the voltage at YP_UL is detected. In the case of FIG. 8, upper sheet 117 does not receive a voltage from lower sheet 118 and the voltage detected is indicative of this non-touching condition. From the voltages detected at the first time and second time, the electronics of the touch screen determines that the two sheets 117 and 118 are not touching each other.

FIG. 9 illustrates touch screen 101 when the user is touching the screen. The two sheets 117 and 118 are therefore touching each other at a point of contact as illustrated. At a first time, a voltage is impressed between XP_UL and XM_LR. The YM_LL end of sheet 118 is made to be an open, and the voltage at YP_UR is used to detect a voltage on lower sheet 118. The upper sheet 117 forms a resistive voltage divider with the point of contact being a tap on the voltage divider. There is no current flow through lower sheet 118 due to YM_LL being open and due to the circuit that detects the voltage having a high input impedance. The voltage detected is therefore the voltage on the tap of the voltage divider. The magnitude of the detected voltage therefore indicates the location of the touching between XP_UL and XM_LR. The voltage may be converted into a digital value and this digital value may be considered to be the X-coordinate of the point of contact. Then, at a second time, a voltage is impressed between YP_UR and YM_LL of the lower sheet 118. The XM_LR end of upper sheet 117 is made to be an open, and the voltage on XP_UL is detected using a detection circuit that has a high input impedance. The lower sheet 118 forms a voltage divider with the point of contact being a tap on the voltage divider. There is no current flow through upper sheet 117, so the voltage detected at XP_UL is the voltage on the tap of the voltage divider, and therefore indicates the location of the touching between YP_UR and YM_LL. This voltage may be converted into a digital value and this digital value may be considered to be Y-coordinate of the point of contact.

Figures 10, 11:
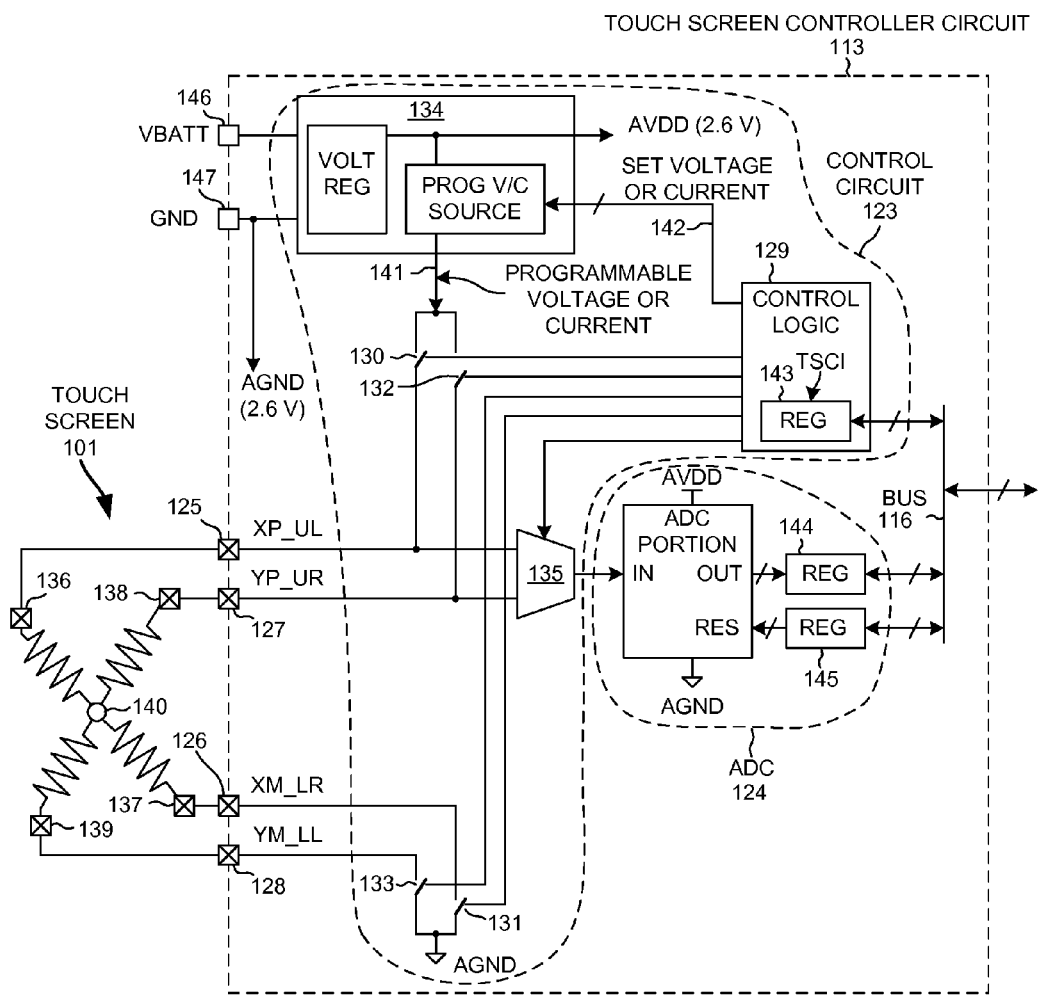
FIG. 10 is a block diagram of the touch screen controller circuit of FIG. 6.
FIG. 11 is a table that sets forth multiple different operating modes of the touch screen controller circuit of FIG. 10.

FIG. 10 is a simplified diagram of touch screen controller circuit 113 and touch screen 101 of FIG. 6. Touch screen controller circuit 113 includes a control circuit 123 and an analog-to-digital converter 124. Touch screen controller circuit 113 and ADC 124 are coupled to processor 110 of FIG. 6 via bus 116. Touch screen controller circuit 113 is coupled to touch screen 101 via a first pair of terminals 125 and 126 and a second pair of terminals 127 and 128. Control circuit 123 includes control logic 129, four switches 130-133, a power supply portion 134, and an analog multiplexer 135. The four switches may, for example, be realized as field effect transistors (FETs). Analog multiplexer 135 may, for example, be realized as a multiplexer of transmission gates of field effect transistors. Touch screen 101 has four terminals 136-139. Circular symbol 140 represents a point of contact between sheets 117 and 118. The point of contact 140 is established, for example, when the finger of a user of cellular telephone 100 presses on touch screen 101. When the touch screen is not being touched, the resistance across each of the sheets is generally in the range of 200 ohms to 2 k ohms. It is fixed for a given individual touch screen, but the resistance varies from touch screen to touch screen due to manufacturing variations.

In one embodiment, control logic 129 sets a regulated voltage on node 141 by supplying an appropriate multi-bit digital value (voltage set value) to power supply portion 134 via lines 142. Power supply portion 134 is coupled to a battery via terminals 146 and 147 and acts as a programmable voltage source. Depending on the value of the multi-bit voltage set value, the voltage on node 141 is set to have a voltage of a selected one of a number of selectable voltages (for example, 2.6 volts, 1.3 volts, 0.65 volts, and 0.1625 volts). In another embodiment, power supply portion 134 acts as a programmable current source. The magnitude of the current sourced onto node 141 is set by control logic 129. Depending on the value of the multi-bit voltage set value on lines 142, the current supplied onto on node 141 is set to have a magnitude of a selected one of a number of selectable currents. Regardless of whether power supply portion 134 is acting as a programmable voltage source or a programmable current source for powering node 141, power supply portion 134 always operates to output regulated analog supply voltage AVDD. This analog supply voltage AVDD is used to power other portions of the circuit.

In the presently described operational example, power supply portion 134 drives node 141 as a programmable voltage source. VBATT received from an external battery (not shown) is approximately 2.6 volts. Analog supply voltage AVDD is 2.6 volts. Execution of the set of processor-executable instructions 114 causes processor 110 to communicate touch screen control information (TSCI) across bus 116 and into register 143 in control logic 129. TSCI determines which one the numerous different selectable voltages is supplied by power supply portion 134 onto node 141. Initially, processor 110 determines that the required touch screen detection resolution is relatively relaxed because the user-selectable icons displayed on touch screen 101 are relatively large. The TSCI value therefore causes a first relatively low regulated voltage to be supplied onto node 141. This voltage is less than the analog supply voltage AVDD of 2.6 volts that is used to power ADC 124. In the present example, the first relatively low regulated voltage is 1.3 volts. ADC 124, however, has a convertible input voltage range over which it can generate an output measurement of substantially the entire zero to 2.6 volt range of AVDD. The terminology "can generate" used here means that if a voltage anywhere in the range of from zero volts to 2.6 volts were to be present on the input lead IN of the ADC portion of ADC 124 of FIG. 10, then the ADC portion would convert that input voltage into a corresponding multi-bit digital output value. The terminology "can generate" does not necessarily mean that a voltage anywhere in the range of from zero volts to 2.6 volts can be present on the ADC input lead IN given the way the remainder of the touch screen controller circuit 113 is configured or used.

During a first time period, control circuit 123 causes a first pair of switches 130 and 131 to be closed. Second pair of switches 132 and 133 are open. The 1.3 volt voltage on node 141 is therefore coupled via switch 130 and terminal 125 to terminal 136 of the touch screen 101. Similarly, ground potential is coupled through switch 131 and terminal 126 onto terminal 137 of touch screen 101. Analog multiplexer 135 is controlled such that the voltage on terminal 127 is coupled onto the high input impedance input of ADC 124. Switch 133 is open. If the touch screen is being pressed, then the voltage at the point of contact 140 is coupled through terminal 138, terminal 127 and multiplexer 135 to ADC 124. ADC 124 converts the voltage into a corresponding first multi-bit digital value. This first value may, for example, be considered to be an X-coordinate value indicative of the location of the point of contact. The value is loaded into register 144 and is read by processor 110 across bus 116. Because the magnitude of the voltage impressed across XP_UL and XM_LR is 1.3 volts, the maximum voltage that can be detected by ADC 124 is 1.3 volts. The entire upper half of ADC steps is not used, despite the fact that ADC 124 is powered by 2.6 volt AVDD. If, for example, ADC 124 is set to have a 12-bit resolution, then the upper half of ADC step values of 2048 to 4095 are not used. The ADC 124 can only output measurement values in the range of from zero to 2047.

Next, during a second time period, control circuit 123 causes second pair of switches 132 and 133 to be closed. First pair of switches 130 and 131 is open. The 1.3 volt voltage on node 141 is therefore coupled via switch 132 and terminal 127 to terminal 138 of the touch screen 101. Similarly, ground potential is coupled through switch 133 and terminal 128 onto terminal 139 of touch screen 101. Analog multiplexer 135 is controlled such that the voltage on terminal 125 is coupled onto the high input impedance input of ADC 124. Switch 131 is open. If the touch screen is being pressed, then the voltage at the point of contact 140 is coupled through terminal 136, terminal 125 and multiplexer 135 to ADC 124. ADC 124 converts the voltage into a corresponding second multi-bit digital value. This second value may, for example, be considered to be a Y-coordinate value indicative of the location of the point of contact. The value is loaded into register 144 and is read by processor 110 across bus 116. The X-coordinate and the Y-coordinate values are indicative of the location of point of contact 140. Rather than supplying touch screen 101 with the full 2.6 volt AVDD voltage, touch screen 101 is advantageously supplied with the substantially smaller 1.3 volt voltage. The corresponding amount of current driven through the touch screen 101 during the measurements is therefore substantially reduced, thereby reducing power consumption of the overall circuit during low touch screen resolution measurements.

Next, in accordance with the presently described operational example, processor 110 determines that the required touch screen detection resolution is relatively high because the user-selectable icons displayed on touch screen 101 are relatively small or because the user is to be using a stylus with a fine point to write on the touch screen. This may, for example, be a situation in which handwriting recognition is occurring. Processor 110 therefore writes a TSCI value across bus 116 into register 143 that causes a second relatively large regulated voltage to be supplied onto node 141. In the present example, this voltage is 2.6 volts. ADC 124 continues to be powered from the 2.6 volt AVDD and has the same convertible input voltage range of from zero to 2.6 volts.

During a first time period, control circuit 123 causes a first pair of switches 130 and 131 to be closed. Second pair of switches 132 and 133 are open. The 2.6 volt voltage on node 141 is therefore coupled via switch 130 and terminal 125 to terminal 136 of the touch screen 101. Similarly, ground potential is coupled through switch 131 and terminal 126 onto terminal 137 of touch screen 101. Analog multiplexer 135 is controlled such that the voltage on terminal 127 is coupled onto the high input impedance input of ADC 124. Switch 133 is open. If the touch screen is being pressed, then the voltage at the point of contact 140 is coupled through terminal 138, terminal 127 and multiplexer 135 to ADC 124. ADC 124 converts the voltage into a corresponding first multi-bit digital value. This first value may, for example, be considered to be an X-coordinate value indicative of the location of the point of contact. The value is loaded into register 144 and is read by processor 110 across bus 116. The magnitude of the voltage impressed across XP_UL and XM_LR is 2.6 volts so that the full 2.6 volt ADC convertible input voltage range of ADC 124 is usable. If, for example, ADC 124 is set to have a 12-bit resolution, then all of the ADC step values of zero to 4095 are used.

Next, during a second time period, control circuit 123 causes second pair of switches 132 and 133 to be closed. First pair of switches 130 and 131 are open. The 2.6 volt voltage on node 141 is therefore coupled via switch 132 and terminal 127 to terminal 138 of the touch screen 101. Similarly, ground potential is coupled through switch 133 and terminal 128 onto terminal 139 of touch screen 101. Analog multiplexer 135 is controlled such that the voltage on terminal 125 is coupled onto the high input impedance input of ADC 124. Switch 131 is open. If the touch screen is being pressed, then the voltage at the point of contact 140 is coupled through terminal 136, terminal 125 and multiplexer 135 to ADC 124. ADC 124 converts the voltage into a corresponding second multi-bit digital value. This second value may, for example, be considered to be a Y-coordinate value indicative of the location of the point of contact. The value is loaded into register 144 and is read by processor 110 across bus 116. The X-coordinate and the Y-coordinate values are indicative of the location of point of contact 140. Touch screen 101 is supplied with the full 2.6 volt AVDD voltage to support the required high touch screen measurement resolution. More power is consumed than in the low touch screen resolution mode described above, but a higher touch screen resolution measurements can be made.

FIG. 11 is a table that sets forth various examples of the operation of the touch screen controller circuit 113 of FIG. 10. Processor 110 controls the touch screen current by writing into register 143 via bus 116. Processor 110 controls ADC resolution by writing into register 145 via bus 116.

Figure 12A:
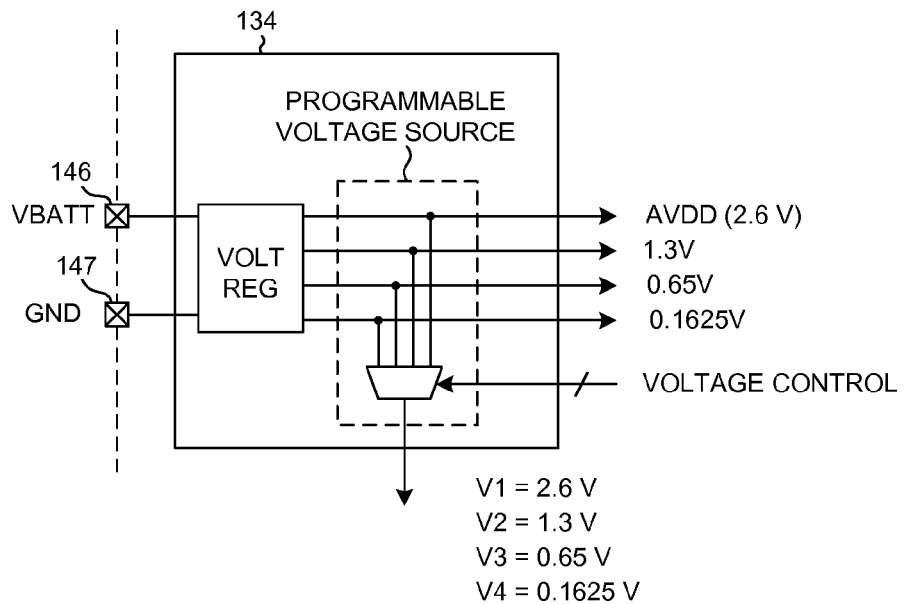
FIG. 12A is a block diagram of a first example of the power supply portion of FIG. 10.

FIG. 12A is a simplified diagram of power supply portion 134 in the embodiment in which control logic 129 controls power supply portion 134 to drive node 141 with a selectable one of a plurality of different regulated voltages.

Figure 12B:
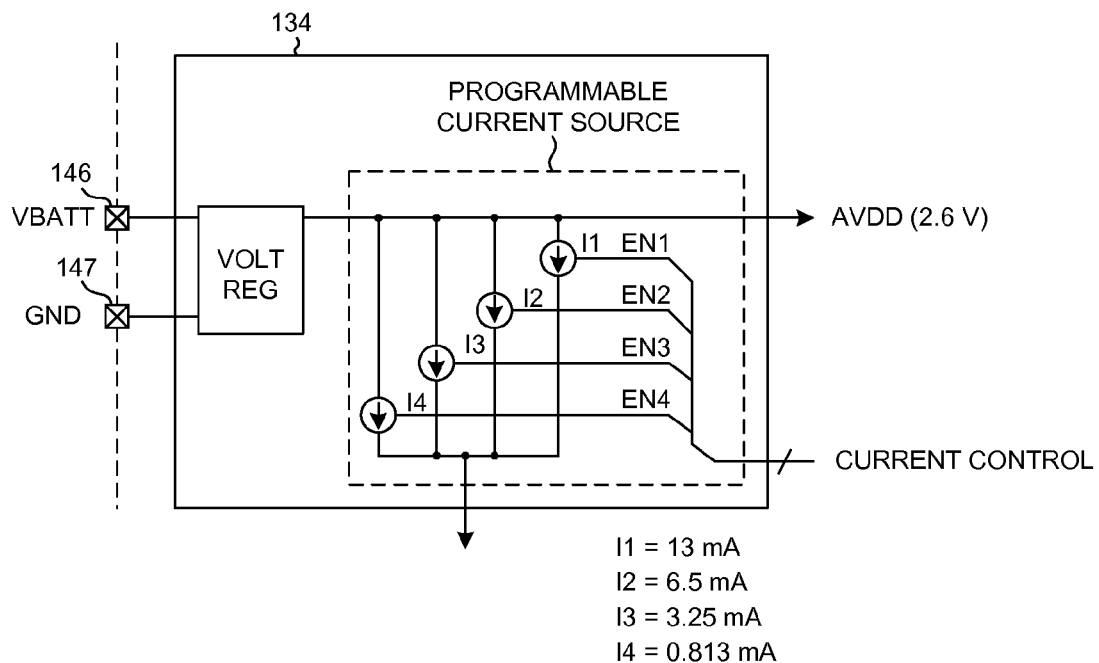
FIG. 12B is a block diagram of a second example of the power supply portion of FIG. 10.

FIG. 12B is a simplified diagram of power supply portion 134 in the embodiment in which control logic 129 controls power supply portion 134 to supply a selectable one of a plurality of different fixed currents onto node 141.

Figure 13:
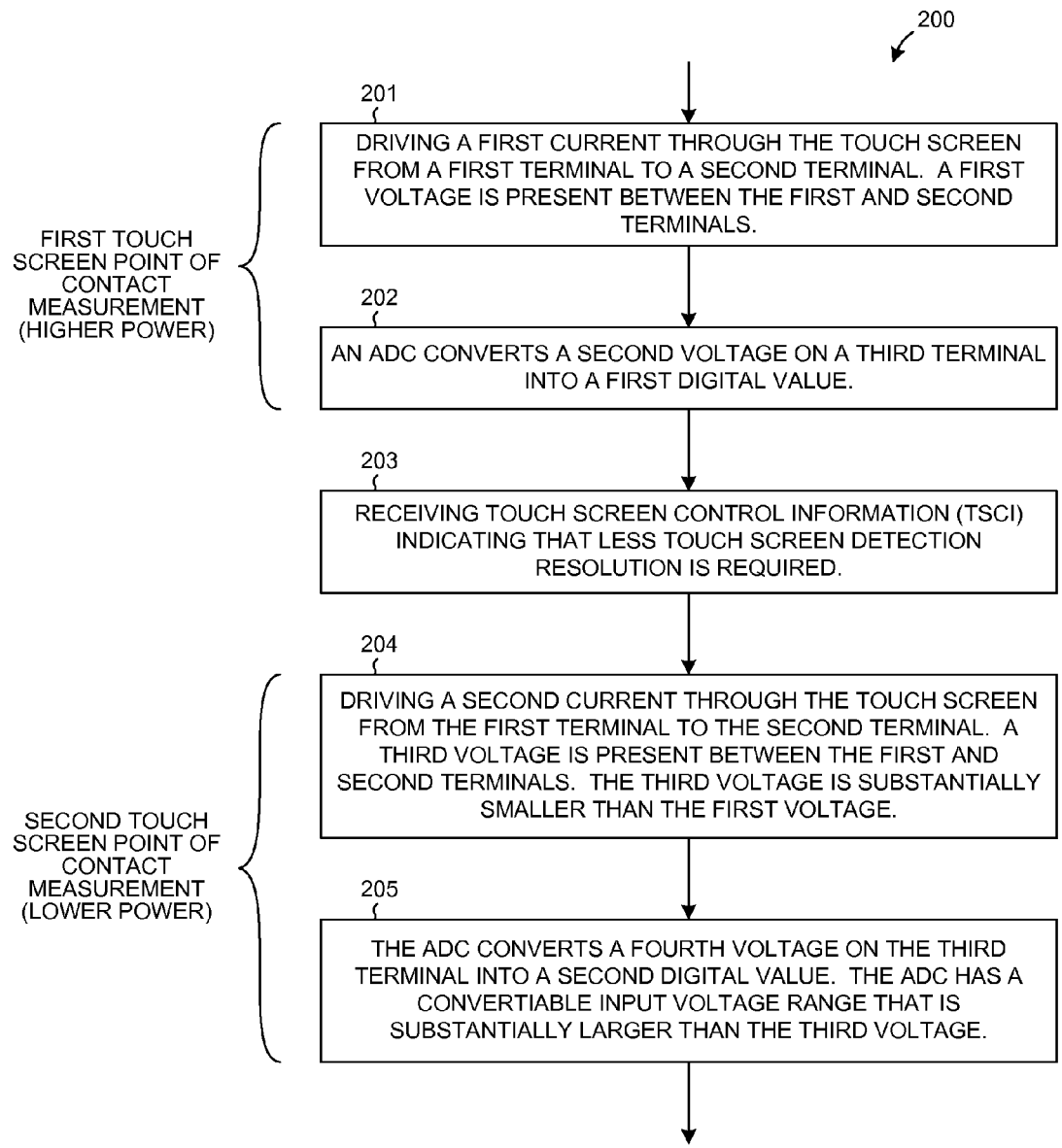
FIG. 13 is a flowchart of a method in accordance with one novel aspect.

FIG. 13 is a simplified flowchart of a novel method 200 in accordance with one operational example. In a first step (step 201), a first current is driven through the touch screen from a first terminal to a second terminal such that a first voltage is present between the first and second terminals. In one example, the first terminal is terminal 125 and the second terminal is terminal 126 and the first voltage is 2.6 volts.

Next (step 202), an ADC converts a second voltage on a third terminal into a first digital value. In one example, the third terminal is terminal 127. Steps 201 and 202 carry out a first touch screen point of contact measurement (an X-coordinate measurement) conducted with a relatively high power.

Although not illustrated in steps in the flowchart of FIG. 13, a similar Y-coordinate measurement is carried out with the relatively high power.

Next (step 203), touch screen control information (TSCI) is received. This TSCI indicates that less touch screen detection resolution is required. In one example, this TSCI is written by processor 110 into register 143.

Next (step 204), a second current is driven through the touch screen from the first terminal to the second terminal such that a third voltage is present between the first and second terminals. In one example, the first terminal is terminal 125 and the second terminal is terminal 126 and the third voltage is 1.3 volts. The third voltage (for example, 1.3 volts) is substantially smaller than the first voltage (for example, 2.6 volts).

Next (step 205), the ADC converts a fourth voltage on the third terminal into a second digital value. In one example, the third terminal is terminal 127. Steps 204 and 205 carry out a second touch screen point of contact measurement (an X-coordinate measurement) conducted with a relatively low power. Although not illustrated in steps in the flowchart of FIG. 13, a similar Y-coordinate measurement is carried out with the relatively low power. The ADC has a convertible input voltage range (for example, zero to 2.6 volts) that is substantially larger than the third voltage (for example, 1.3 volts). The lower power measurement of steps 204 and 205 has a lower touch screen detection resolution, but this lower touch screen detection resolution is adequate under certain situations and in these situations power consumption is reduced by using the lowest acceptable power consumption setting for the point of contact measurements to be performed. The first and second touch screen measurements are not just measurements made during a calibration process, but rather are touch screen measurements made during normal touch screen operation to receive user input into the mobile communication device 100.

In one or more exemplary embodiments, the functions described may be implemented in hardware, software, firmware, or any combination thereof If implemented in software, the functions may be stored on or transmitted over as one or more instructions or code on a computer-readable medium (sometimes referred to as a processor-readable medium). Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. In other embodiments, an amplifier having a controllable gain is disposed between multiplexer 135 and ADC 124. A relatively low voltage/current is used to drive the touch screen, but the relatively low voltage output to be measured is amplified by the controllable gain amplifier prior to the signal being supplied to ADC 124. The gain of the amplifier is determined by the TSCI value written into control logic 129. Although the ADC is always powered by AVDD in the embodiments set forth above, in other embodiments the supply voltage that powers the ADC is reduced along with the voltage that powers the touch screen. In some examples, the processor 110 determines that battery power is undesirably low and the processor 110 in response reduces touch screen detection resolution in order to reduce battery power consumption and to extend battery life. Using a reduced touch screen resolution may prevent the touch screen from being usable in certain ways such as, for example, for handwriting recognition, but this is acceptable if using the reduced touch screen detection resolution will extend battery life and allow the mobile communication device to perform other more essential tasks for a longer period of time before the battery is totally discharged. Accordingly, various modifications, adaptations, and combinations of the various features of the described specific embodiments can be practiced without departing from the scope of the claims that are set forth below.

What is claimed is:

1. An integrated circuit comprising:
a first pair of terminals;
a second pair of terminals;
a control circuit that during a first time period supplies one of a plurality of selectable voltages onto a first of the first pair of terminals and that couples a second of the first pair of terminals to a ground potential, and that during a second time period supplies said one of the plurality of selectable voltages onto a first of the second pair of terminals and that couples a second of the second pair of terminals to the ground potential; and
an analog-to-digital converter (ADC) that measures a first voltage present on one of the terminals of the second pair of terminals during the first time period and generates therefrom a first measurement value, and that measures a second voltage present on one of the terminals of the first pair of terminals during the second time period and generates therefrom a second measurement value, wherein the first and second measurement values are touch screen point of contact location measurements, wherein the ADC has a convertible input voltage range over which it can generate an output measurement corresponding to a voltage on an input of the ADC, and wherein a voltage difference between said one of the selectable voltages and ground potential is substantially smaller than the convertible input voltage range.

2. The integrated circuit of claim 1, wherein the integrated circuit is adapted to be coupled to a resistive touch screen such that a current flows, during the first time period, from the control circuit, out of the integrated circuit from first terminal of the first pair, through the touch screen, and back into the integrated circuit via the second terminal of the first pair.

3. The integrated circuit of claim 1, wherein the control circuit stores touch screen control information (TSCI), wherein which one of the plurality of selectable voltages is supplied during the first time period and the second time period is determined by a value of the TSCI stored in the control circuit.

4. The integrated circuit of claim 1, wherein the first and second measurement values are not used for calibration purposes.

5. The integrated circuit of claim 1, wherein the ADC is powered from a voltage that is substantially larger than said one of the selectable voltages.

6. The integrated circuit of claim 1, wherein the control circuit stores touch screen control information (TSCI), wherein if the TSCI has a first value then the control circuit supplies a first amount of current out of the first terminal of the first pair of terminals during the first and second time periods, whereas if the TSCI has a second value then the control circuit supplies a second amount of current out of the first terminal of the first pair of terminals during the first and second time periods.

7. The integrated circuit of claim 1, wherein the control circuit comprises a programmable voltage source that outputs said one of the plurality of selectable voltages.

8. A system for controlling a touch screen, the system comprising:
an analog-to-digital converter (ADC) that measures a voltage received from the touch screen during a point of contact location measurement time period, wherein the ADC has a convertible input voltage range over which it can generate an output measurement corresponding to a voltage on an input of the ADC; and
a control circuit that supplies one of a plurality of selectable voltages to the touch screen during the point of contact location measurement time period, wherein the voltage received by the ADC is due to a current supplied by the control circuit to the touch screen, and wherein said one of the selectable voltages is substantially smaller than the convertible input voltage range.

9. The system of claim 8, wherein a second of the selectable voltages is substantially of the same magnitude as the convertible input voltage range.

10. A system for controlling a touch screen comprising:
an analog-to-digital converter (ADC) that measures a magnitude of a signal received from the touch screen during a point of contact location measurement time period; and
a control circuit that supplies one of a plurality of selectable currents of different magnitudes to the touch screen during the point of contact location measurement time period, wherein the signal received by the ADC is due to said one current supplied by the control circuit to the touch screen during the point of contact location measurement time period, wherein the ADC has a convertible input voltage range over which it can generate an output measurement corresponding to a voltage on an input of the ADC, wherein the touch screen has a first terminal and a second terminal, wherein said one selectable current flows into the first terminal of the touch screen and out of the second terminal of the touch screen such that a voltage is present between the first and second terminals during the point of contact location measurement time period, and wherein the voltage present between the first and second terminals is substantially smaller than the convertible input voltage range of the ADC.

11. A method comprising:
(a) driving a first current into a first terminal of a touch screen, through the touch screen, and out of a second terminal of the touch screen such that a first voltage is present between the first and second terminals;
(b) converting a second voltage on a third terminal of the touch screen into a first digital value, wherein the second voltage is present on the third terminal during (a);
(c) driving a second current into the first terminal of the touch screen, through the touch screen, and out of the second terminal of the touch screen such that a third voltage is present between the first and second terminals, wherein the third voltage is substantially smaller than the first voltage; and
(d) converting a fourth voltage on the third terminal of the touch screen into a second digital value, wherein the fourth voltage is present on the third terminal during (c), wherein (a) and (b) occur during a first point of contact location measurement time period, and wherein (c) and (d) occur during a second point of contact location measurement time period.

12. The method of claim 11, wherein the converting of (b) and (c) is performed by an analog-to-digital converter (ADC), wherein the ADC has a convertible input voltage range over which it can generate an output measurement corresponding to a voltage supplied to the ADC, and wherein the convertible input voltage range is substantially larger than the third voltage.

13. The method of claim 11, further comprising:
(e) receiving a first multi-bit digital value, wherein the first multi-bit digital value determines the first voltage, wherein (e) occurs before (a); and
(f) receiving a second multi-bit digital value, wherein the second multi-bit digital value determines the third voltage, wherein (f) occurs before (c).

14. The method of claim 11, wherein the first current in (a) is a fixed current that is supplied from a current source, and wherein the first voltage is a voltage that results when the first current flows through the touch screen from the first terminal to the second terminal.

15. The method of claim 11, wherein the first voltage in (a) is a fixed voltage that is supplied from a voltage regulator onto the first terminal of the touch screen when a ground potential is present on the second terminal of the touch screen, and wherein the first current is a current that results when the first voltage is present on the first terminal of the touch screen and when ground potential is on the second terminal of the touch screen.

16. A method comprising:
(a) providing a control circuit adapted to drive a selectable current into a first terminal of a touch screen, through the touch screen, and out of a second terminal of the touch screen, wherein a first voltage is present between the first and second terminals when the selectable current is flowing during a point of contact location measurement; and
(b) providing an analog-to-digital converter (ADC) adapted to measure a second voltage present on a third terminal of the touch screen when the selectable current is flowing, wherein the ADC has a convertible input voltage range over which it can generate an output measurement corresponding to a voltage on an input of the ADC, and wherein the convertible input voltage range is substantially larger than the first voltage during the point of contact location measurement.

17. The method of claim 16, wherein the selectable current is one of a plurality of currents of different magnitudes.

18. A circuit comprising:
a first pair of terminals;
a second pair of terminals; and means for, during a first point of contact location measurement time period, driving a first selectable current out of a first terminal of the first pair, through a touch screen, and back into a second terminal of the first pair, and for measuring a first voltage present on a first terminal of the second pair during the flow of the first selectable current, wherein the means is also for, during a second point of contact location measurement time period, driving a second selectable current out of the first terminal of the first pair, through the touch screen, and back into the second terminal of the first pair, and for measuring a second voltage present on the first terminal of the second pair during the flow of the second selectable current, wherein the second selectable current is substantially smaller than the first selectable current, wherein the means includes an ADC used to do the measuring of the second voltage, wherein the ADC has a convertible input voltage range that is larger than the second voltage during the second point of contact location measurement time period.

19. The circuit of claim 18, wherein the means is also for receiving a multi-bit digital value, and for using the multi-bit digital value to set a magnitude of a current driven out of the first terminal of the first pair during a measuring of a voltage present on the first terminal of the second pair.

20. The circuit of claim 18, wherein the first selectable current is driven by supplying a fixed voltage onto the first terminal of the first pair, and wherein the first selectable current is a current that results when the fixed voltage is supplied onto the first terminal of the first pair when the second terminal of the first pair is grounded.

21. The circuit of claim 18, wherein the first selectable current is a fixed current that is supplied by the means and that is output by the means through the first terminal of the first pair.

22. A set of instructions stored on a computer-readable medium, wherein execution of the set of instructions is for:
changing a magnitude of a drive current to be driven through a touch screen during a touch screen point of contact location measurement, wherein the magnitude of the drive current is changed such that a first touch screen point of contact location measurement is made using a first drive current, such that a second touch screen point of contact location measurement is made using a second drive current, and wherein the first drive current is substantially greater than the second drive current.

23. The set of instructions of claim 22, wherein the set of instructions is stored in semiconductor memory within a cellular telephone, wherein execution of the instructions by a processor of the cellular telephone causes control information to be communicated across a bus within the cellular telephone to a control circuit, and wherein the control circuit controls the magnitude of the drive current.

24. The set of instructions of claim 23, wherein the control information communicated across the bus causes the control circuit to change the magnitude of drive current from the first drive current to the second drive current.

* * * * *